US012643985B2

(12) United States Patent
Shindo et al.

(10) Patent No.: US 12,643,985 B2
(45) Date of Patent: Jun. 2, 2026

(54) GAS BARRIER FILM AND METHOD FOR MANUFACTURING GAS BARRIER FILM

(71) Applicant: LINTEC CORPORATION, Tokyo (JP)

(72) Inventors: Nana Shindo, Saitama (JP); Satoshi Naganawa, Tokyo (JP)

(73) Assignee: LINTEC Corporation, Tokyo (JP)

( * ) Notice: Subject to any disclaimer, the term of this patent is extended or adjusted under 35 U.S.C. 154(b) by 0 days.

(21) Appl. No.: 18/849,603

(22) PCT Filed: Mar. 14, 2023

(86) PCT No.: PCT/JP2023/009751
§ 371 (c)(1),
(2) Date: Sep. 23, 2024

(87) PCT Pub. No.: WO2023/189516
PCT Pub. Date: Oct. 5, 2023

(65) Prior Publication Data
US 2025/0109266 A1     Apr. 3, 2025

(30) Foreign Application Priority Data

Mar. 29, 2022     (JP) ................................. 2022-053925

(51) Int. Cl.
| | |
|---|---|
| *B32B 7/00* | (2019.01) |
| *B32B 9/00* | (2006.01) |
| *C08J 3/28* | (2006.01) |
| *C08J 7/04* | (2020.01) |
| *C08J 7/048* | (2020.01) |

(52) U.S. Cl.
CPC .............. *C08J 7/0427* (2020.01); *C08J 3/28* (2013.01); *C08J 2367/03* (2013.01); *C08J 2483/16* (2013.01)

(58) Field of Classification Search
CPC ............. B32B 9/00; B32B 27/00; C08J 7/048
See application file for complete search history.

(56) References Cited

U.S. PATENT DOCUMENTS

| | | | |
|---|---|---|---|
| 2012/0064321 A1 | 3/2012 | Suzuki et al. | |
| 2014/0199544 A1 | 7/2014 | Naganawa et al. | |
| 2015/0166751 A1* | 6/2015 | Fukumoto ................ C08J 7/126 |
| | | | 427/535 |
| 2016/0312363 A1 | 10/2016 | Yamashita et al. | |

FOREIGN PATENT DOCUMENTS

| | | |
|---|---|---|
| JP | 4956692 B1 | 6/2012 |
| JP | 2014043094 A | 3/2014 |
| JP | 2015116804 A | 6/2015 |
| JP | 2019010733 A | 1/2019 |
| WO | WO-2013035432 A1 | 3/2013 |
| WO | WO-2014007277 A1 | 1/2014 |
| WO | WO-2015098671 A1 | 7/2015 |

OTHER PUBLICATIONS

International Search Report issued Jun. 6, 2023, in PCT/JP2023/009751 (with English translation), 8 pages.
Office Action issued Dec. 5, 2023 in corresponding Japanese Patent Application No. 2023-545983 (with English translation), 7 pages.
Written Opinion of the International Searching Authority issued Jun. 6, 2023 in PCT/JP2023/009751 (with English translation), 10 pages.
Decision to Grant issued May 24, 2024 in corresponding Japanese Patent Application No. 2023-545983 (with English translation), 5 pages.

* cited by examiner

*Primary Examiner* — Karuna P Reddy
(74) *Attorney, Agent, or Firm* — Element IP, PLC

(57) ABSTRACT

Provided are a gas barrier film and manufacturing methods for making the gas barrier film. The gas barrier film includes a gas barrier layer containing silicon and oxygen as main components. The gas barrier layer has a region in the thickness direction containing silicon, oxygen, and nitrogen. The region has an element ratio of nitrogen of 5 at % or greater and a thickness of 30 nm or greater.

5 Claims, 4 Drawing Sheets

(a)

(b)

GAS BARRIER FILM AND METHOD FOR MANUFACTURING GAS BARRIER FILM

TECHNICAL FIELD

The present invention relates to a gas barrier film, and a method for manufacturing the gas barrier film.

BACKGROUND ART

In recent years, a gas barrier film has been widely used as a substrate material and a sealing material. In addition to high gas barrier properties by which the gas barrier film can suppress permeation of water vapor, oxygen, or the like, for example, the gas barrier film is required to have higher translucency so as not to impair the visibility of the object to which the gas barrier film is attached, such as an electronic device, and is required not to compromise the light-weight property of the object to be attached.

From the viewpoint described above, it is known that a gas barrier layer made of an inorganic film or the like is formed directly on a support; or a thin resin layer is formed by applying a curable composition containing a curable compound on a support, and curing the curable compound contained in the resulting coating layer, and then a gas barrier layer made of an inorganic film or the like is formed directly on this resin layer or is a manner that another layer is interposed in between the gas barrier layer and the resin layer.

Hereinafter, a property of suppressing permeation of water vapor, oxygen, or the like is referred to as a "gas barrier property", and a film having a gas barrier property is referred to as a "gas barrier film".

As a technique to enhance a gas barrier property, modification by injecting a specific ion into a gas barrier layer by plasma irradiation has been proposed.

For example, Patent Document 1 describes that a layered body, in which a primary film containing silicon and at least one type of element selected from the group consisting of nitrogen and oxygen as main components is formed, is subjected to low-pressure plasma treatment and modification by applying electricity between a plurality of electrodes disposed at specific positions. Examples of Patent Document 1 describes that a polysilazane film is applied on a PET film and subjected to plasma treatment using a helium (He) gas.

Furthermore, Patent Document 2 describes that a layer containing a polysilazane compound is subjected to modification treatment using a plasma ion beam.

Furthermore, examples of the ion species used during modification treatment include hydrogen, nitrogen, argon, helium, neon, xenon, and krypton, and argon is mainly used in the Examples of Patent Document 2.

CITATION LIST

Patent Literature

Patent Document 1: JP 2015-116804 A
Patent Document 2: JP 4956692 B

SUMMARY OF INVENTION

Technical Problem

In recent years, further improvement for performance of a gas barrier film has been demanded and, for example, exhibition of high gas barrier performance, improvement of resistance to stress loading from outside by enhancing film strength, and suppression of reduction in gas barrier property by improving hygrothermal durability have been demanded. For example, industrially, a gas barrier film is often wound into a roll shape as a wound body after being produced as a long film, and stored and transported as an intermediate product before being assembled into an end product, such as the electronic device described above. For this reason, the gas barrier film is required to have resistance to a stress applied from outside and to suppress reduction in performance in a hot and humid environment.

It is conceivable that the gas barrier layer specifically produced in each of Patent Documents 1 and 2 described above has a modification region of less than 30 nm in thickness taking conditions for modification into consideration. Thus, the gas barrier property may be reduced due to stress loading (transport by roll to roll or post processing such as lamination) to the gas barrier layer, and the gas barrier performance may be reduced by stress loading (expansion and shrinkage) caused by difference in heat and moisture absorption behaviors from those of a base material film during hygrothermal durability test.

In addition, securing a high gas barrier property over the entire gas barrier film is demanded. In particular, such demand is even stronger in a case where a size of an object to which a gas barrier film is attached is large and, in response to this, an area of the gas barrier film is also required to be enlarged.

In light of the problems described above, an object of the present invention is to provide a gas barrier film having a high gas barrier property and a high modulus of surface elasticity and having excellent hygrothermal durability, and a manufacturing method thereof. Another object of the present invention is to provide a gas barrier film having a high gas barrier property over the entire surface and a manufacturing method thereof.

Solution to Problem

In response to the issues, diligent research was carried out and, the inventors of the present invention found that the issues described above can be solved by allowing a gas barrier layer to have a region which contains silicon, oxygen, and nitrogen and in which an element ratio of nitrogen is 5 at % or greater, and setting a thickness of the region to a specific thickness. The inventors of the present invention also found that the issues described above can be solved by performing modification treatment in specific conditions. Based on these findings, the inventors of the present invention have completed the present invention.

That is, the present invention provides the following [1] to [12].

[1] A gas barrier film including:
a gas barrier layer containing silicon and oxygen, and
a region in a thickness direction of the gas barrier layer, the region containing silicon, oxygen, and nitrogen, and having an element ratio of nitrogen of 5 at % or greater, and a thickness $d_M$ of the region being 30 nm or greater.
[2] The gas barrier film according to [1], where change in an element ratio of silicon, an element ratio of oxygen, and an element ratio of nitrogen in the thickness direction of the gas barrier layer has a point indicating a maximum value of the element ratio of nitrogen, a point indicating a maximum value of the element ratio of silicon, and a point indicating a minimum value of the element ratio of oxygen.

[3] The gas barrier film according to [1] or [2], where a water vapor transmission rate in an atmosphere at 40° C. and a relative humidity of 90% is less than $6.0 \times 10^{-3}$ g/m²/day.

[4] The gas barrier film according to any one of [1] to [3], where a thickness $d_G$ of the gas barrier layer and the thickness $d_M$ of the region having an element ratio of nitrogen of 5 at % or greater satisfy a relationship $1 \geq d_M/d_G \geq 0.01$.

[5] The gas barrier film according to any one of [1] to [4], where a modulus of surface elasticity of the gas barrier film is 24.5 GPa or greater.

[6] A gas barrier film including a gas barrier layer containing silicon and oxygen, where, in a case where the gas barrier film is cut into any square shape having an area of 50.5 mm×50.5 mm and the cut square-shaped gas barrier film is sectioned into 64 squares each having an identical shape, the number of sections having a water vapor transmission rate in an atmosphere at 40° C. and a relative humidity of 90% of less than $1.0 \times 10^{-3}$ g/m²/day is 95% or greater of the total number of sections of the sectioned square-shaped gas barrier film.

[7] The gas barrier film according to [6], where the number of sections having the water vapor transmission rate of less than $1.0 \times 10^{-3}$ g/m²/day and $1.0 \times 10^{-7}$ g/m²/day or greater is 85% or greater of the total number of sections of the sectioned square-shaped gas barrier film.

[8] The gas barrier film according to [6] or [7], where the water vapor transmission rate in an atmosphere at 40° C. and a relative humidity of 90% is less than $1.0 \times 10^{-3}$ g/m²/day.

[9] A method for manufacturing a gas barrier film, the gas barrier being the gas barrier film described in any one of [1] to [8], the method including:

forming a gas barrier precursor layer on a base material film by using a composition containing a silicon-containing macromolecular compound, and forming the gas barrier layer by modifying the gas barrier precursor layer by subjecting a surface part of the gas barrier precursor layer to plasma irradiation.

[10] The method for manufacturing a gas barrier film according to [9], where the gas barrier layer is formed by modifying the gas barrier precursor layer by subjecting the surface part of the gas barrier precursor layer to plasma irradiation in the presence of a helium gas for 300 seconds or longer.

[11] The method for manufacturing a gas barrier film according to [10], where the gas barrier precursor layer is placed on electrodes and the gas barrier precursor layer is subjected to the plasma irradiation while superimposed direct-current power and alternating-current power is applied to the electrodes.

[12] The method for manufacturing a gas barrier film according to any one of [9] to [11] above, where the gas barrier layer is formed by modifying the gas barrier precursor layer by subjecting the surface part of the gas barrier precursor layer to plasma irradiation in the presence of helium gas for 700 seconds or longer.

Advantageous Effects of Invention

According to the present invention, a gas barrier film having a high gas barrier property and a high modulus of surface elasticity and having excellent hygrothermal durability, and a manufacturing method thereof can be provided. According to the present invention, a gas barrier film having a high gas barrier property over the entire surface and a manufacturing method thereof can be provided.

DESCRIPTION OF EMBODIMENTS

Figure 1:
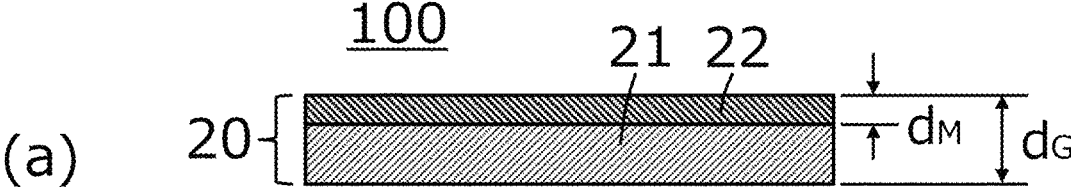
FIG. 1 is a cross-sectional schematic view illustrating an example of a gas barrier film.
Figure 1:
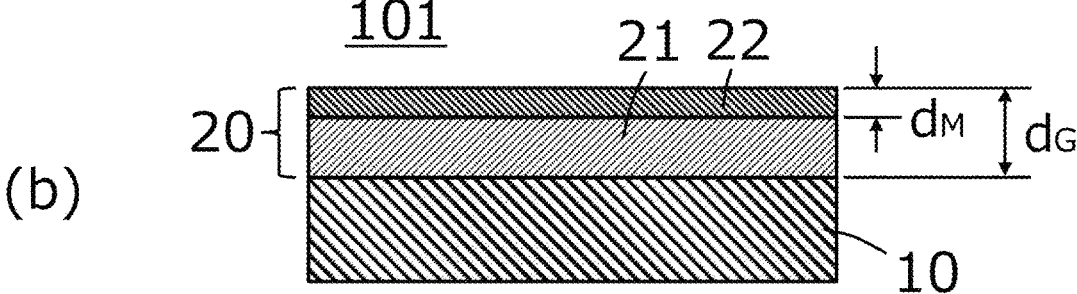

A gas barrier film according to an embodiment of the present invention will be described below.

In the present specification, the preferred provisions can be selected as desired, and combinations of the preferred provisions are more preferable.

In the present specification, the description "from XX to YY" means "XX or higher and YY or lower" or "XX or greater and YY or less".

In the present specification, the lower and upper limits of a preferable numerical range (for example, a range of content) described in series can each be independently combined. For example, from the description "preferably from 10 to 90, more preferably from 30 to 60", the "preferred lower limit (10)" and the "preferred upper limit (60)" can be combined as "from 10 to 60".

1. Gas Barrier Film

A gas barrier film of a first embodiment of the present invention (hereinafter, also referred to as "first gas barrier film") is a gas barrier film including: a gas barrier layer containing silicon and oxygen, and a region in a thickness direction of the gas barrier layer, the region containing silicon, oxygen, and nitrogen, and having an element ratio of nitrogen of 5 at % or greater, and a thickness $d_M$ of the region being 30 nm or greater.

The first gas barrier film includes a region in a thickness direction of the gas barrier layer, the region contains silicon, oxygen, and nitrogen, and the region has an element ratio of nitrogen of 5 at % or greater. It is conceivable that this reflects a hard structure in which silicon and nitrogen are bonded and, as a result, this is advantageous for exhibiting a high gas barrier performance and a high modulus of surface elasticity.

Furthermore, because the region having a high gas barrier property is adequately ensured due to the thickness of the region being 30 nm or greater, the gas barrier property is improved even more, a film strength of the gas barrier layer is increased due to the increased modulus of surface elasticity, and resistance to stress loading from outside is improved.

Furthermore, the gas barrier property of the gas barrier film in a hot and humid environment is less likely to deteriorate, and the hygrothermal durability is improved.

From the viewpoint of enhancing gas barrier property and from the viewpoint of ease in production, the thickness $d_M$ is preferably from 32 to 500 nm, and more preferably from 38 to 300 nm. In addition, from the viewpoint of further enhancing strength of the gas barrier layer, the thickness $d_M$ is even more preferably from 48 to 150 nm.

Note that the thickness of the region containing silicon, oxygen, and nitrogen, and having an element ratio of nitrogen of 5 at % or greater can be measured by a cross-sectional TEM image of the gas barrier layer and elementary analysis using an X-ray photoelectron spectrometer and, specifically, can be measured by the method described in Examples.

A gas barrier film of a second embodiment of the present invention (hereinafter, also referred to as "second gas barrier film") is a gas barrier film including a gas barrier layer containing silicon and oxygen, in a case where the gas barrier film is cut into any square shape having an area of 50.5 mm×50.5 mm and the cut square-shaped gas barrier film is sectioned into 64 squares each having an identical shape, the number of sections having a water vapor transmission rate in an atmosphere at 40° C. and a relative humidity of 90% of less than $1.0×10^1$ $g/m^2/day$ is 95% or greater, preferably from 96 to 100%, and more preferably from 97 to 100%, of the total number of sections of the sectioned square-shaped gas barrier film.

In the second gas barrier film, a portion in which water vapor permeability is poor due to a defect such as a pinhole is less in the entire gas barrier layer, the entire gas barrier layer has high water vapor permeability.

Since the second gas barrier film is produced by subjecting a gas barrier precursor layer, formed by using a composition containing a silicon-containing macromolecular compound, to a modification treatment as described below, the gas barrier layer does not need to include a plurality of layers made of various materials. Therefore, a defect or the like due to non-uniformity of a bonding portion between adjacent layers of various materials is less likely to occur, and a uniform gas barrier layer having no pinhole is readily formed.

1-1. Configuration Example of Gas Barrier Film

A specific example of a configuration of the gas barrier film of the first embodiment of the present invention is illustrated in FIG. 1.

The gas barrier film 100 illustrated in a cross-sectional schematic view of FIG. 1(a) includes a gas barrier layer 20 having a gas barrier property. The gas barrier layer 20 includes a region 21 having an element ratio of nitrogen of less than 5 at % and another region, that is, a region 22 having an element ratio of nitrogen of 5 at % or greater.

Hereinafter, a region containing silicon, oxygen, and nitrogen and having an element ratio of nitrogen of 5 at % or greater may be referred to as "high nitrogen-content region", and a region containing silicon, oxygen, and nitrogen and having an element ratio of nitrogen of less than 5 at % may be referred to as "low nitrogen-content region". Note that "high nitrogen-content region" refers to a region in which the thickness does not decrease as time passes and which is stable overtime.

As in the gas barrier film 101 illustrated in the cross-sectional schematic view of FIG. 1(b), a base material film 10 and the gas barrier layer 20 may be included in this order.

In this case, the base material film 10 and the gas barrier layer 20 may be in direct contact, or another layer may be interposed between the base material film 10 and the gas barrier layer 20.

When the base material film 10 and the gas barrier layer 20 are in direct contact, the gas barrier film 100 is readily made thin.

Among two main surfaces of the first gas barrier film, at least one face may have a release sheet or a protective film. That is, in a case of the gas barrier film 100, a release sheet or a protective film may be provided on at least one of a surface on the high nitrogen-content region 22 side or a surface of the low nitrogen-content region 21 side. In a case of the gas barrier film 101, a release sheet or a protective film may be provided on at least one of a face on the side opposite to the gas barrier layer 20 of the base material film 10 or a face on the side opposite to the base material film 10 of the gas barrier layer 20.

When a release sheet or a protective film is provided, during storage or transport of the gas barrier film in an intermediate product state before use in an end product, the gas barrier layer 20 and the base material film 10 can be protected.

In the first gas barrier film, the gas barrier layer includes a region (high nitrogen-content region) 22 in which an element ratio of nitrogen is 5 at % or greater. Note that "at %" represents atomic ratio.

In the gas barrier layer 20 of each of the gas barrier films 100 and 101 illustrated in FIGS. 1(a) and 1(b), a region (high nitrogen-content region) 22 having an element ratio of nitrogen of 5 at % or greater is present on a surface layer side of the gas barrier layer 20 (in a case of gas barrier film 101, a side opposite to the base material film 10), and the other is a region (low nitrogen-content region) 21 having the element ratio of a nitrogen atom of less than 5 at %.

The high nitrogen-content region may be positioned on the outer most surface of the gas barrier layer or may be positioned inside the gas barrier layer. From the viewpoint of exhibiting excellent gas barrier property and surface elasticity and from the viewpoint of ease in production, the high nitrogen-content region is preferably disposed on the outermost surface of the gas barrier layer.

In the first gas barrier film, a plurality of high nitrogen-content regions may be present in the depth direction.

Figure 2:
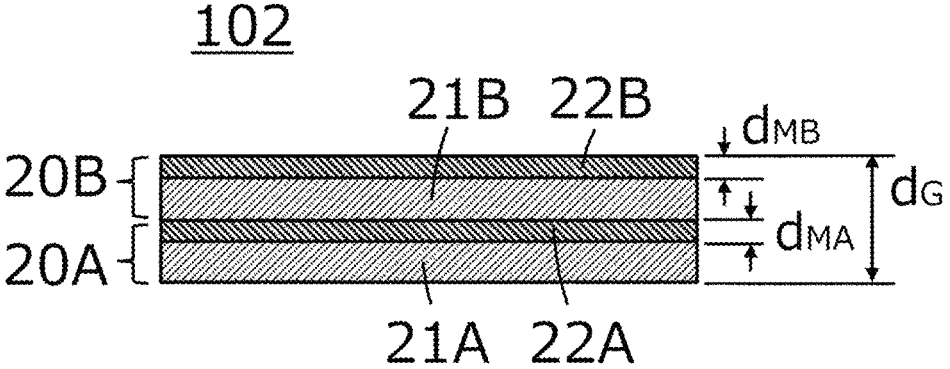
FIG. 2 is a cross-sectional schematic view illustrating another example of a gas barrier film.

FIG. 2 illustrates another example of the first gas barrier film. The gas barrier film 102 illustrated in the cross-sectional schematic view of FIG. 2 includes a plurality of gas barrier layers 20A and 20B in this order. The gas barrier layer 20A includes a high nitrogen-content region 22A and a low nitrogen-content region 21A, and the gas barrier layer 20B includes a high nitrogen-content region 22B and a low nitrogen-content region 21B. In other words, a plurality of high nitrogen-content regions is present in the depth direction of the gas barrier layer.

As described above, in a case where a plurality of high nitrogen-content regions is included, the total thickness thereof is 30 nm or greater. In a case of the gas barrier film 102 illustrated in FIG. 2, the total of the thickness $d_{MA}$ of the high nitrogen-content region 22A and the thickness $d_{M}B$ of the high nitrogen-content region 22B is 30 nm or greater.

From the viewpoint of preventing water vapor transmission from an end portion, one of the plurality of high nitrogen-content regions is preferably disposed on the outermost surface of the gas barrier film.

Note that, as in the gas barrier film 102, the gas barrier layer including the plurality of high nitrogen-content regions in the depth direction can be produced by, for example, repeating formation of a gas barrier precursor layer to form a gas barrier layer and the modification treatment described below.

In the first gas barrier film, an element ratio of nitrogen can be gradually and continuously changed from the outermost surface to the depth direction of the gas barrier layer by forming high nitrogen-content regions by a modification treatment as described below.

Typically, change in an element ratio of silicon, an element ratio of oxygen, and an element ratio of nitrogen in the thickness direction of the gas barrier layer has a point indicating a maximum value of the element ratio of nitrogen, a point indicating a maximum value of the element ratio of silicon, and a point indicating a minimum value of the element ratio of oxygen.

Figure 3:
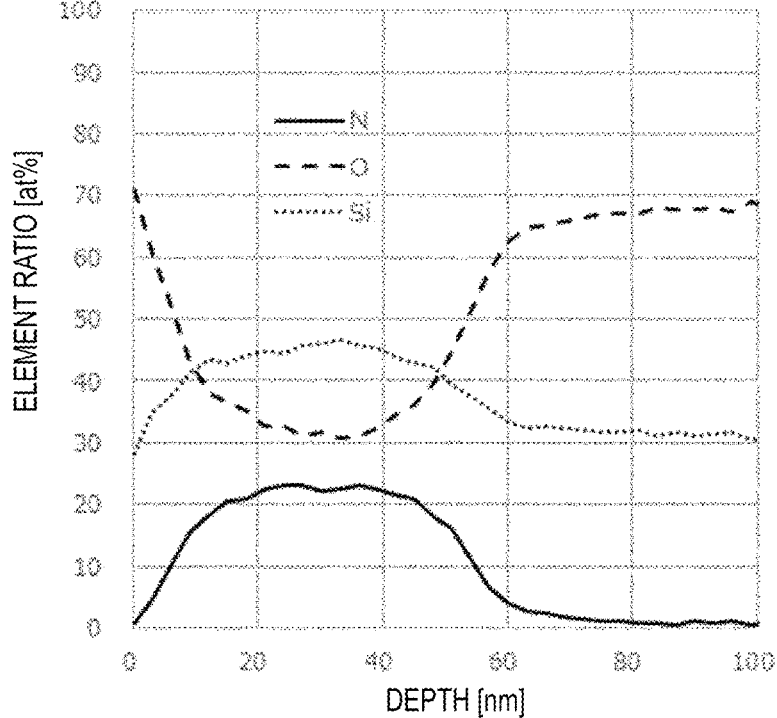
FIG. 3 is a graph showing an example of element ratio in a depth direction of a gas barrier layer.

FIG. 3 is a graph showing an example of element ratio in a depth direction of a gas barrier layer. As is clear from the example shown in FIG. 3, in a region of a depth from 20 to 40 nm from the surface, points showing the maximum values of the element ratios of nitrogen and silicon each exist, and a point showing the minimum value of the element ratio of oxygen exists.

It is presumable that, in the region to which the modification treatment is performed by ion implantation as described below, the modification causes a deprotonation reaction, by which hydrogen bonds of a Si—H bond and a N—H bond of polysilazane are cut, and formation of a new Si—N bond, resulting change of the film structure to a fine film structure. Therefore, it is conceivable that the region to which the modification treatment is performed has a higher element ratio of nitrogen and, accordingly, the element ratios of oxygen and silicon decrease.

The thickness of the first gas barrier film can be determined as appropriate according to the application of the target electronic device or the like. From the viewpoint of handling properties, the substantial thickness of the gas barrier film is preferably from 1 to 1000 $\mu$m, more preferably from 5 to 200 $\mu$m, and more preferably from 15 to 100 $\mu$m.

The "substantial thickness" refers to the thickness in a use state. That is, when the gas barrier film includes a release sheet or a protective film, the thicknesses of the release sheet and the protective film that are removed in use is not included in the "substantial thickness".

From the viewpoint of ensuring a high gas barrier property, the water vapor transmission rate in an atmosphere at 40° C. and a relative humidity of 90% of the first gas barrier film is preferably $6.0 \times 10^{-3}$ g/m²/day or less, more preferably $5.4 \times 10^{-3}$ g/m²/day or less, even more preferably $5.0 \times 10^{-3}$ g/m²/day or less, yet even more preferably $4.5 \times 10^{-3}$ g/m²/day or less, and yet even more preferably $4.0 \times 10^{-3}$ g/m²/day or less.

The water vapor transmission rate is measured by a known method.

The gas barrier performance of the first gas barrier film is preferably less likely to decrease even in a high humidity and high temperature environment. For example, the change percentage of the water vapor transmission rate of a gas barrier film when the gas barrier film is allowed to stand still in an atmosphere at 85° C. and a relative humidity of 85% for 500 hours (=(value after hygrothermal test/initial value)× 100) is preferably 200% or less, more preferably 150% or less, and particularly preferably 120% or less.

In the first gas barrier film, from the viewpoint of improvement of the gas barrier property and the surface elasticity and from the viewpoint of ease in production, the thickness $d_G$ of the gas barrier layer and the thickness $d_M$ of the region having an element ratio of the nitrogen of 5 at % or greater (high nitrogen-content region) preferably satisfies the relationship $1 > d_M/d_G \geq 0.01$, more preferably satisfies the relationship $0.70 \geq d_M/d_G \geq 0.05$, even more preferably satisfies the relationship $0.50 \geq d_M/d_G \geq 0.10$, yet even more preferably satisfies the relationship $0.40 \geq d_M/d_G \geq 0.12$, and particularly preferably satisfies the relationship $0.35 \geq d_M/d_G \geq 0.16$.

From the viewpoint of improvement of the gas barrier property and the surface elasticity and from the viewpoint of ease in production, the thickness $d_G$ of the gas barrier layer is preferably from 30 to 1500 nm, more preferably from 50 to 1000 nm, even more preferably from 60 to 600 nm, and yet even more preferably from 100 to 300 nm.

Even if the thickness $d_G$ of the gas barrier layer is in the order of nanometers, a gas barrier film having adequate gas barrier performance can be produced by providing the high nitrogen-content region.

From the viewpoint of enhancing resistance to external load and from the viewpoint of ease in production, the modulus of surface elasticity of the first gas barrier film is preferably from 24.5 to 100 GPa, more preferably from 25 to 50 GPa, and even more preferably from 28 to 35 GPa. Although the upper limit is not particularly limited, from the viewpoint of ease in production, the modulus of surface elasticity of the first gas barrier film is preferably 100 GPa or less, more preferably 50 GPa or less, and particularly preferably 35 GPa or less.

In the present specification, the modulus of surface elasticity is a value measured at 23° C. by using a surface hardness tester, and specifically measured by the procedure described in Examples.

The basic structure of the second gas barrier film can be identical to that of the first gas barrier film illustrated in FIG. 1 and FIG. 2 described above. In the second gas barrier film, in a case where the gas barrier film is cut into any square shape having an area of 50.5 mm×50.5 mm and the cut square-shaped gas barrier film is sectioned into 64 squares each having an identical shape, the number of sections having a water vapor transmission rate in an atmosphere at 40° C. and a relative humidity of 90% of less than $1.0 \times 10^{-3}$ g/m²/day is 95% or greater of the total number of sections of the sectioned square-shaped gas barrier film.

The proportion of the number of sections having the water vapor transmission rate of less than $1.0 \times 10^{-3}$ g/m²/day can be specifically measured by the method described in Examples.

The second gas barrier film is produced by subjecting a gas barrier precursor layer, formed by using a composition containing a silicon-containing macromolecular compound, to a modification treatment as described below. The gas barrier layer of the gas barrier film produced by this method contains silicon, oxygen, and nitrogen, and similarly to the first gas barrier film, a region having a high ratio of nitrogen atoms is formed on a surface side (side opposite to the base material film) of the gas barrier layer, and a region having a low ratio of nitrogen atoms is formed on a back face side (base material film side) of the gas barrier layer. In the region having a high ratio of nitrogen, points showing the maximum values of the element ratios of nitrogen and silicon each exist, and a point showing the minimum value of the element ratio of oxygen exists.

The region having a high ratio of nitrogen in the second gas barrier film, for example, contains silicon, oxygen, and nitrogen and is a region having an element ratio of nitrogen of 5 at % or greater, similarly to the high nitrogen-content region in the first gas barrier film described above. Furthermore, the region having a low ratio of nitrogen atoms in the second gas barrier film, for example, contains silicon, oxygen, and nitrogen and is a region having an element ratio of nitrogen of less than 5 at %, similarly to the low nitrogen-content region in the first gas barrier film described above. Hereinafter, in accordance with the first gas barrier film, a region having a high ratio of nitrogen atoms in the second gas barrier film is referred to as a high nitrogen-content region, and a region having a low ratio of nitrogen atoms in the second gas barrier film is referred to as a low nitrogen-content region. Furthermore, the thickness of the high nitrogen-content region of the second gas barrier film is represented as $d_M{}'$, and the thickness of the second gas barrier film is represented as $d_G{}'$.

From the viewpoint of ease in ensuring a high gas barrier property in the entire surface of the gas barrier layer and from the viewpoint of ease in production, the thickness $d_M{}'$ of the high nitrogen-content region of the second gas barrier film is preferably from 38 to 500 nm, more preferably from 40 to 300 nm, even more preferably from 48 to 150 nm, and yet even more preferably from 50 to 150 nm.

Note that the thickness $d_M{}'$ can be adjusted to the range described above by performing a modification treatment by plasma-ion irradiation using helium gas for an adequate time period.

From the viewpoint of a high gas barrier property and ease in production, the thickness $d_G{}'$ of the gas barrier layer of the second gas barrier film is preferably from 30 to 1500 nm, more preferably from 50 to 1000 nm, even more preferably from 60 to 600 nm, and yet even more preferably from 100 to 300 nm.

In the second gas barrier film, from the viewpoint of ease in ensuring a high gas barrier property in the entire surface of the gas barrier layer and from the viewpoint of ease in production, the thickness $d_G{}'$ of the gas barrier layer and the thickness $d_M{}'$ of the high nitrogen-content region preferably satisfy a relationship $1 > d_M{}'/d_G{}' \geq 0.01$, more preferably satisfy a relationship $0.70 \geq d_M{}'/d_G{}' \geq 0.10$, even more preferably satisfy a relationship $0.60 \geq d_M{}'/d_G{}' \geq 0.15$, yet even more preferably satisfy a relationship $0.50 \geq d_M{}'/d_G{}' \geq 0.20$, and particularly preferably satisfy a relationship $0.40 \geq d_M{}'/d_G{}' \geq 0.25$.

In the second gas barrier film, from the viewpoint of making it easier to provide the gas barrier property in the entire surface of the gas barrier layer and ease in production in a compatible manner, the number of sections having a water vapor transmission rate of less than $1.0 \times 10^{-3}$ g/m²/day and $1.0 \times 10^{-7}$ g/m²/day or greater is preferably 85% or greater, more preferably from 90 to 100%, and even more preferably from 96 to 100% or greater, of the total number of sections of the sectioned square-shaped gas barrier film.

The water vapor transmission rate of the second gas barrier film in an atmosphere of 40° C. and a relative humidity of 90% is preferably less than $1.0 \times 10^{-3}$ g/m²/day, more preferably $8.0 \times 10^{-4}$ g/m²/day or less, and even more preferably $1.0 \times 10^{-4}$ g/m²/day or less. When the water vapor transmission rate of the second gas barrier film is in the range described above, even higher gas barrier property is readily ensured.

The thickness of the second gas barrier film, the change percentage of the water vapor transmission rate of the second gas barrier film after the second gas barrier film is allowed to stand still in an atmosphere at 85° C. and a relative humidity of 85% for 500 hours, and the modulus of surface elasticity of the second gas barrier film are the same as those for the first gas barrier film.

1-2. Base Material Film

As the base material film, various resin films can be used, and a polyethylene terephthalate (PET) film, a polybutylene terephthalate (PBT) film, a polylactic acid (PLA) film, a polycarbonate film, a cycloolefin-based film, and a cellulose-based film are preferably used.

These base material films, by themselves, have substantially no gas barrier property (in other words, the water vapor transmission rate in an atmosphere at 40° C. and a relative humidity of 90% is 10 g/m²/day or greater), and those having excellent light transmission are easily available at a low cost. The base material film may have various layers, such as a primer layer, a primer layer, an oligomer deposition prevention layer, a lubricative layer, an anti-static layer, and a hard coating layer, on its surface. The base material film may be produced by performing a primer treatment by a corona treatment, a flame treatment, or the like.

The base material film may be a film to which a heat resistance imparting treatment such as an annealing treatment is not performed or may be a film to which a heat resistance imparting treatment is performed.

The base material film may be a film having a gas barrier property by itself (in other words, the water vapor transmission rate in an atmosphere at 40° C. and a relative humidity of 90% is less than 10 g/m²/day) such as a drawn polypropylene, polyvinylidene chloride, or a fluororesin. Note that, in a case of a base material film having a gas barrier property, because the base material film blocks oxygen from penetrating through the base material film from outside, no change may occur in the element ratio of the gas barrier layer over time even after a modification treatment. On the other hand, in a case where a base material film having substantially no gas barrier property is used, as a result of oxygen penetrating the base material film after a modification treatment, the composition of the unmodified region in the gas barrier layer becomes close to $SiO_2$.

1-3. Gas Barrier Layer and High Nitrogen-Content Region

The first and second gas barrier films each include a gas barrier layer containing silicon and oxygen.

The gas barrier layer is made of, for example, a coating film of a composition containing a silicon-containing macromolecular compound. The first gas barrier film includes a region (high nitrogen-content region) in a thickness direction of the gas barrier layer. The region contains silicon, oxygen, and nitrogen. The region has an element ratio of nitrogen of 5 at % or greater. The thickness $d_M$ of this region is 30 nm or greater. When the thickness is 30 nm or greater, adequately excellent gas barrier property, surface elasticity, and hygrothermal durability are achieved. Furthermore, the second gas barrier film includes the high nitrogen-content region in a thickness direction of the gas barrier layer, and the thickness $d_M{}'$ of this region is preferably 38 nm or greater.

In preferred embodiments of the first and second gas barrier films, the high nitrogen-content region is formed on the outermost surface of the gas barrier layer, and in a case where the gas barrier film includes a base material film, the high nitrogen-content region is formed on a side opposite to the base material film of the gas barrier layer and is also an outermost layer of each of the first and second gas barrier films. Thus, in such embodiments, the high nitrogen-content region is exposed outside, and in a case where the gas barrier film is produced by roll to roll, the high nitrogen-content region is easily brought into contact with a guide roll or the like during the production process. However, the first gas barrier film has a thickness of the high nitrogen-content region of 30 nm or greater and has high gas barrier property and modulus of surface elasticity. Therefore, even when external load is applied during production or transportation, damage is less likely to be caused, and the gas barrier property is less likely to change with respect to change in environment during transportation or during storage. The same applies to the second gas barrier film.

The gas barrier layer is made of a gas barrier precursor layer and is preferably a layer made of a layer produced by drying and curing a coating film of a composition containing a silicon-containing macromolecular compound as the gas barrier precursor layer. The high nitrogen-content region can be formed by the modification treatment described below.

The high nitrogen-content region produced by subjecting a layer, produced by drying and curing the coating film of the composition containing the silicon-containing macromolecular compound, to the modification treatment described below can efficiently form a gas barrier layer having excellent gas barrier property. In particular, by performing plasma irradiation in the presence of helium gas, a high nitrogen-content region having an adequate thickness is readily formed.

In the gas barrier layer produced by subjecting a layer (hereinafter, may be referred to as a "silicon-containing macromolecular layer") containing a silicon-containing macromolecular compound to a modification treatment, one type of the silicon-containing macromolecular compounds may be used or two or more types of the silicon-containing macromolecular compounds may be used in a combination.

Examples of the silicon-containing polymer compound include: a polysilazane-based compound (see JP S63-16325 B, JP S62-195024 A, JP S63-81122 A, JP H1-138108 A, JP H2-84437 A, JP H2-175726 A, JP H4-63833 A, JP H5-238827 A, JP H5-345826 A, JP 2005-36089 A, JP H6-122852 A, JP H6-299118 A, JP H6-306329 A, JP H9-31333 A, JP H10-245436 A, JP 2003-514822 T, and WO 2011/107018); a polycarbosilane-based compound (see Journal of Materials Science, 2569-2576, Vol. 13, 1978; Organometallics, 1336-1344, Vol. 10, 1991; Journal of Organometallic Chemistry, 1-10, Vol. 521, 1996; JP S51-126300 A, JP 2001-328991 A, JP 2006-117917 A, JP 2009-286891 A, and JP 2010-106100 A); and a polysilane-based compound (R. D. Miller, J. Michl; Chemical Reviews, Vol. 89, page 1359 (1989), N. Matsumoto; Japanese Journal of Physics, Vol. 37, p. 5425 (1998); and JP 2008-63586 A, and JP 2009-235358 A).

Of these, a polysilazane-based compound is preferable from the perspective of capability to form a gas barrier layer having excellent gas barrier property. Examples of the polysilazane-based compound include an inorganic polysilazane and an organic polysilazane. Examples of the inorganic polysilazane include perhydropolysilazane, and examples of the organic polysilazane include a compound produced by substituting some or all of the hydrogen in perhydropolysilazane with an organic group such as an alkyl group. Of these, an inorganic polysilazane is more preferable from the perspective of ease of access and being able to form a gas barrier layer having excellent gas barrier property.

Further, as the polysilazane-based compound, a commercially available product sold as a glass coating material or the like can be used as it is.

One type of the polysilazane-based compound can be used alone or two or more types of the polysilazane compounds can be used in a combination.

In addition to the silicon-containing macromolecular compound described above, the silicon-containing macromolecular layer may contain another component within a range that does not inhibit the object of the present invention. Examples of the other component include a curing agent, another polymer, an anti-aging agent, a light stabilizer, and a flame retardant.

From the viewpoint of forming a high nitrogen-content region exhibiting excellent gas barrier property, the content of the silicon-containing macromolecular compound in the silicon-containing macromolecular layer is preferably 50 mass % or greater, and more preferably 70 mass % or greater.

Examples of the method for forming the silicon-containing macromolecular layer include a method including: coating a gas barrier layer-forming solution on the base material film by a known method, the gas barrier layer-forming solution containing at least one silicon-containing macromolecular compound, another component optionally, and a solvent; and drying the resulting coating film as appropriate.

During the formation of the high nitrogen-content region, when, for example, a polysilazane-based compound as described above is used, a polysilazane conversion reaction occurs by heating after coating, resulting in a coating film having a gas barrier property.

The thickness of the silicon-containing macromolecular layer is preferably from 30 to 1500 nm, more preferably from 40 to 1000 nm, even more preferably from 60 to 600 nm, and even more preferably from 100 to 300 nm.

Even if the thickness of the silicon-containing macromolecular layer is in the order of nanometers, a gas barrier film having sufficient gas barrier performance can be provided by performing a modification treatment thereafter.

Before the modification treatment, a treatment to advance conversion reaction of the silicon-containing macromolecular compound may be performed. Examples of such a treatment include (a) ultraviolet irradiation treatment, (b) steam treatment by which water vapor is sprayed on the coating film of the composition containing the silicon-containing macromolecular compound, and (c) a method of storing in an environment at approximately 30 to 60° C. for a long term, which is 180 hours or longer. From the viewpoints of ease in treatment and capability of performing the treatment in a short period of time, the conversion reaction preferably proceeds by ultraviolet irradiation.

For the ultraviolet irradiation treatment, ultraviolet ray having a wavelength higher than 200 nm, which is different from vacuum-ultraviolet light, is used.

The ultraviolet ray can be irradiated by using, for example, a high-pressure mercury lamp, an electrodeless lamp, or a xenon lamp.

The wavelength of the ultraviolet ray is preferably from 200 to 400 nm. That is, the maximum value of the intensity of the ultraviolet ray is preferably in a wavelength region from 200 to 400 nm. The intensity is usually from 50 to 1000 mW/cm$^2$, and the amount of light is usually from 50 to 5000 mJ/cm$^2$. The duration of irradiation is usually from 0.1 to 1000 seconds. The ultraviolet irradiation may be applied a plurality of times so that the amount of light falls within the above range taking account of the thermal load during the irradiation process.

The modification treatment is a treatment that is different from the ultraviolet irradiation, and examples of the modification treatment include ion implantation and vacuum ultraviolet light irradiation (irradiation of excimer laser and the like). Among these, ion implantation is preferable from the perspective of being able to provide high gas barrier performance. In ion implantation, the dose of ions implanted into the polymer layer may be determined as appropriate according to the purpose of the gas barrier film to be formed (necessary gas barrier property, transparency, and the like).

As the ion to be implanted, at least one type of ions selected from the group consisting of hydrogen, nitrogen, oxygen, argon, helium, neon, xenon, and krypton is preferred.

According to the study of the present inventors, it became clear that helium tends to penetrate deep into the gas barrier layer compared to argon and can form a high nitrogen-content region having a thickness that cannot be achieved by argon. Thus, from the viewpoint of facilitating formation of a thick high nitrogen-content region, helium gas ions are particularly preferred.

Note that, within a range that does not inhibit the effect of the present invention, helium gas ions and other ions may be implanted in combination.

The method of ion implantation is not limited, and examples include a method of irradiating ions (ion beam) accelerated by an electric field and a method of implanting plasma ions. Of these, the latter, a method of implanting plasma ions, is preferable because a film having gas barrier property can be easily produced.

The plasma ion implantation method is preferably: (I) a method of implanting ions present in the plasma generated using an external electric field into the silicon-containing macromolecular layer; or (II) a method of implanting ions present in the plasma generated only by the electric field generated by a negative high voltage pulse applied to the layer into the silicon-containing macromolecular layer without using an external electric field.

In the method (I) above, the pressure during ion implantation (pressure during plasma ion implantation) is preferably from 0.01 to 1 Pa. When the pressure during plasma ion implantation is within this range, ions can be easily, efficiently, and uniformly implanted, and the target gas barrier layer can be efficiently formed.

The method (II) does not require increasing the degree of decompression, deploys simple processing operation, and reduces the processing time greatly. Also, the entire layer can be treated uniformly, and ions in the plasma can be continuously implanted into the silicon-containing macromolecular layer with high energy when a negative high voltage pulse is applied. Furthermore, good quality ions can be implanted uniformly into the silicon-containing macromolecular layer by simply applying a negative high voltage pulse to the layer without requiring any other special means such as a high frequency power source such as radio frequency (abbreviated as "RF" hereafter) or microwave.

In either of the above methods (I) and (II), the pulse width when applying a negative high voltage pulse, that is, during ion implantation, is preferably from 1 to 15 psec. When the pulse width is within this range, ions can be implanted more easily, efficiently, and uniformly.

Furthermore, the applied voltage when generating plasma is preferably from −1 to −50 kV, more preferably from −1 to −30 kV, and particularly preferably from −5 to −20 kV. When ion implantation is performed at an applied voltage of greater than −1 kV, the ion implantation amount (dose) is insufficient, and the desired performance is not achieved. Meanwhile, when ion implantation is performed at an applied voltage less than −50 kV, the film builds up static charge during ion implantation, and defects such as coloration of the film occur, which is not desirable.

Examples of the ion species used in plasma ion implantation include the same as those exemplified as the ions to be implanted.

A plasma ion implantation device is used during the process of implanting ions in a plasma into the silicon-containing macromolecular layer.

Specific examples of the plasma ion implantation device include (i) a plasma ion implantation device that generates plasma using an external electric field, such as a high-frequency power source of microwave, applies a high-voltage pulse, and induces and implants ions in the plasma, and (ii) a plasma ion implantation device that implants ions in a plasma generated only by an electric field generated by application of a high-voltage pulse without using an external electric field.

A method that deploys the plasma ion implantation device of (i) and (ii) is described in WO 2010/021326.

In the plasma ion implantation device of (i) and (ii), a high voltage pulse power supply is also used as a plasma generating means for generating plasma. Therefore, other special means such as a high-frequency power source such as RF and microwave are not necessary, and by simply applying a negative high voltage pulse, a plasma can be generated, and ions in the plasma can be continuously implanted into a silicon-containing macromolecular layer. Thus, a silicon-containing macromolecular layer having a portion modified by ion implantation in the surface part, that is, a gas barrier film in which a gas barrier layer is formed, can be mass-produced.

From the viewpoints of in-plane uniformity and modification efficiency of the modification treatment, a plasma ion implantation device that irradiates the gas barrier precursor layer with plasma by placing the gas barrier precursor layer on electrodes while superimposed direct-current power and alternating-current power is applied to the electrodes is preferably used.

A fact that ions have been implanted can be confirmed by, for example, performing elemental analysis measurement at a position from the surface of the silicon-containing macromolecular layer using X-ray photoelectron spectroscopy (XPS).

1-4. Release Sheet and Protective Film

The release sheet has a role of protecting the base material film during, for example, storage or transportation of the gas barrier film, and the release sheet is peeled off in a predetermined process.

The release sheet is preferably in the shape of a sheet or a film. The shape of a sheet or a film is not limited to an elongated shape and also includes the shape of a short flat plate.

Examples of the release sheet include: a paper substrate such as glassine paper, coat paper, and wood-free paper; a laminated paper in which a thermoplastic resin such as polyethylene or polypropylene is laminated on such a paper substrate; the paper substrate described above sealed with, for example, cellulose, starch, polyvinyl alcohol, or acrylic-styrene resin; or, a plastic film, such as a polyester film such as polyethylene terephthalate, polybutylene terephthalate, and polyethylene naphthalate, and a polyolefin film such as polyethylene and polypropylene; and glass.

Furthermore, the release sheet may have a release agent layer provided on a paper substrate or a plastic film from the view point of ease in handling. In a case where a release agent layer is provided, the release layer can be formed using a known release agent, such as a silicone-based release agent, a fluorine-based release agent, an alkyd-based release agent, and an olefin-based release agent.

The protective film has a role of protecting the gas barrier layer during, for example, storage or transportation of the gas barrier film, and the protective film is peeled off in a predetermined process.

The protective film is preferably in the shape of a sheet or a film. The shape of a sheet or a film is not limited to an elongated shape and also includes the shape of a short flat plate.

Since the protective film is typically adhered to a surface of a gas barrier layer after the gas barrier layer is formed, from the viewpoint of preventing unintended release of the protective film from the gas barrier layer, the protective film preferably has a structure in which a pressure sensitive adhesive layer is provided on a base material. In this case, the pressure sensitive adhesive layer is provided on a surface on the gas barrier layer side of the protective film. When the protective film includes a pressure sensitive adhesive layer, the protective film is adhered to the gas barrier layer in a releasable manner. As the base material of the protective film, the material and thickness that are same as those of the release sheet can be used.

Examples of the pressure sensitive adhesive constituting the pressure sensitive adhesive layer include an acrylic pressure sensitive adhesive, a urethane-based pressure sensitive adhesive, a silicone-based pressure sensitive adhesive, a rubber-based pressure sensitive adhesive, a pressure sensitive adhesive containing a polyolefin-based polymer, and a pressure sensitive adhesive containing a polyolefin-based copolymer. The pressure sensitive adhesive layer more preferably contains at least one of a polyolefin-based polymer or a polyolefin-based copolymer. Examples of the polyolefin-based polymer include polyethylene and polypropylene. Examples of the polyolefin-based copolymer include an ethylene-vinyl acetate copolymer and an ethylene-(meth) acrylic acid copolymer.

Furthermore, examples of a commercially available protective film containing a polyolefin-based pressure sensitive adhesive, which can be used as the protective film (β), include SUNYTECT PAC-3-50THK and SUNYTECT PAC-2-70, available from Sun A. Kaken Co., Ltd.

1-5. Other Configuration Example of Gas Barrier Film

The gas barrier films of the first and second embodiments of the present invention are not limited to those illustrated in FIG. 1 and FIG. 2, and may contain one or two or more additional layers on the base material film, in between base material film and the gas barrier layer, or on the gas barrier layer, in a range that does not impair the object of the present invention.

Examples of such an additional layer include other gas barrier layer and a protective layer. The position of such an additional layer to be placed is not limited to those described above.

Furthermore, the gas barrier film may be long. In this case, the gas barrier film may be in a roll shape provided by winding the gas barrier film around a core material.

2. Method for Manufacturing Gas Barrier Film

The method for manufacturing a gas barrier film of an embodiment of the present invention to produce the first and second gas barrier films includes the following processes.

Gas barrier precursor layer formation process of forming a gas barrier precursor layer on a base material film by using a composition containing a silicon-containing macromolecular compound Modification process of subjecting the gas barrier precursor layer to a modification treatment Furthermore, the gas barrier precursor layer formation process preferably includes the following processes.

Application process of forming a coating film by applying a composition containing a silicon-containing macromolecular compound on a base material film Process of drying the coating film In this case, the modification process is performed after the drying process.

The method for manufacturing a gas barrier film more preferably includes the following processes.

Process of forming a gas barrier precursor layer on a base material film by using a composition containing a silicon-containing macromolecular compound, and Process of forming the gas barrier layer by modifying the gas barrier precursor layer by subjecting a surface part of the gas barrier precursor layer to plasma irradiation as the modification process Furthermore, the first aspect of the method for manufacturing a gas barrier film (hereinafter, also referred to as the method for manufacturing a gas barrier film (1)) includes a process of forming the gas barrier layer by modifying the gas barrier precursor layer by subjecting the surface part of the gas barrier precursor layer for forming the gas barrier layer to plasma irradiation in the presence of helium gas for 300 seconds or longer, as the modification process. The method for manufacturing a gas barrier film (1) is a manufacturing method suitable for producing the first gas barrier film described above.

In the method for manufacturing a gas barrier film (1), when the high nitrogen-content region is formed by the modification treatment, the ultraviolet irradiation process may be performed after start of heating the coating film for high nitrogen-content region formation but prior to the modification process. By this, the conversion reaction of the silicon-containing macromolecular compound in the gas barrier film can adequately proceed, and a gas barrier film that is hard and that is less likely to be scratched is readily produced.

Furthermore, in the modification process in the second aspect of the method for manufacturing a gas barrier film (hereinafter, also referred to as the method for manufacturing a gas barrier film (2)), the gas barrier layer is formed by modifying the gas barrier precursor layer by subjecting the surface part of the gas barrier precursor layer to plasma irradiation in the presence of helium gas for 700 seconds or longer.

By employing the plasma irradiation in the presence of helium gas for 700 seconds or longer as the modification treatment, a modification region having an adequate thickness for the entire gas barrier layer in the planar direction is readily formed. By this, occurrence of pinholes that reduce the gas barrier property is suppressed, and high gas barrier property is ensured for the entire gas barrier layer. The method for manufacturing a gas barrier film (2) is a manufacturing method suitable for producing the second gas barrier film described above.

Furthermore, in the application process of the method for manufacturing a gas barrier film (2), the gas barrier precursor layer may be formed by applying the composition containing the silicon-containing macromolecular compound on the base material film by using a die coater and then heating the resulting coating layer.

By applying the composition onto the base material film by using the die coater, a coating layer having a uniform thickness and a large area can be efficiently formed, and as a result, a uniform modification region is readily formed by the modification treatment, and occurrence of pinholes tends to decrease.

The drying process of the method for manufacturing a gas barrier film (2) is the same as the drying process of the method for manufacturing a gas barrier film (1).

Figure 4:
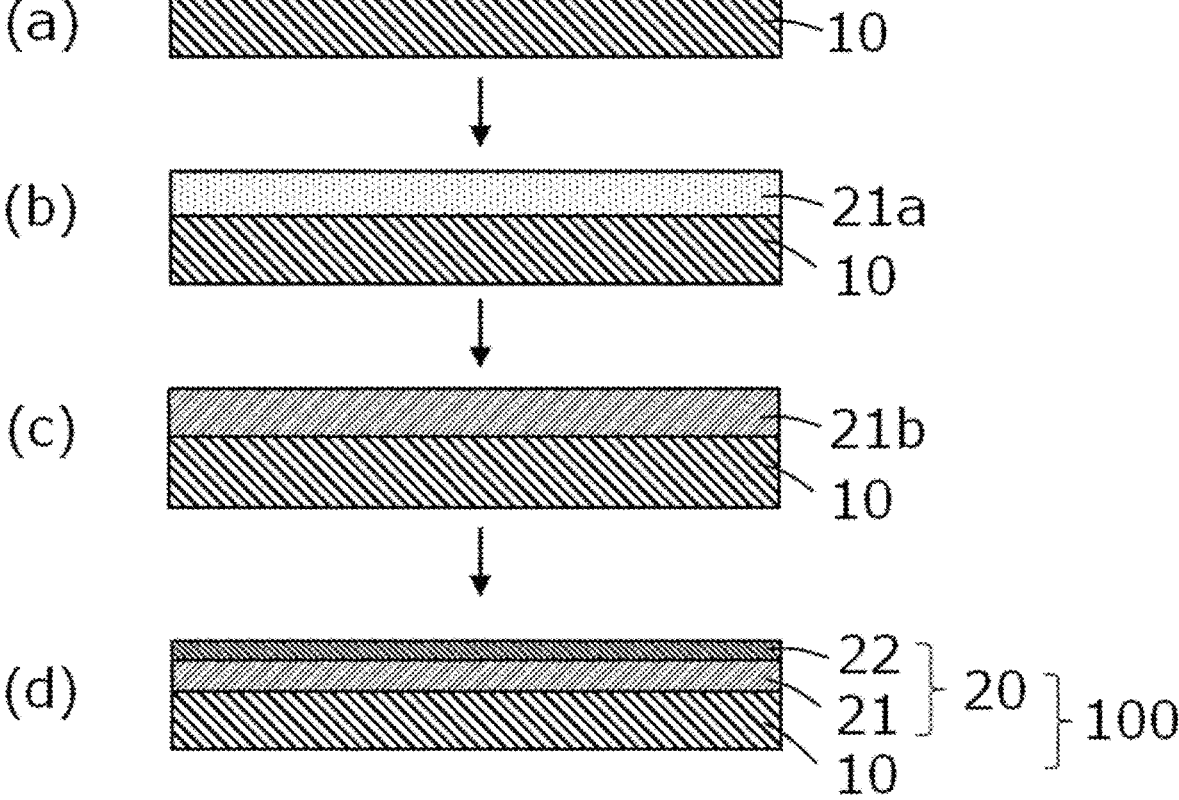
FIG. 4 is a process chart illustrating an example of a method for manufacturing a gas barrier film.

FIG. 4 illustrates an example of production processes of the methods for manufacturing a gas barrier film (1) and (2). FIGS. 4(a) to 4(c) illustrate processes of forming a gas barrier precursor layer on a base material film. FIG. 4(d) corresponds to the modification process described above. Each process will be described below using a case where a gas barrier layer produced by subjecting a gas barrier precursor layer, which is a layer containing a silicon-containing macromolecular compound, to a modification treatment is formed as an example, and using the figures as reference.

2-1. Preparation of Base Material Film

A base material film is prepared (sign 10 of FIG. 4(*a*)).

2-2. Formation of Gas Barrier Layer

Application Process

A coating film (sign 21*a* of FIG. 4(*b*)) is formed by using a solution which is the composition containing the silicon-containing macromolecular compound (hereinafter, also referred to as "gas barrier layer-forming solution") or the like on the base material film (application process).

When applying the gas barrier layer-forming solution, a known device such as a spin coater, a knife coater, and a gravure coater can be used in the method for manufacturing a gas barrier film (1). In the method for manufacturing a gas barrier film (2), a die coater is preferably used as described above.

Drying Process

Next, this coating film of the composition is dried by heating. In this way, a gas barrier precursor layer (sign 21*b* of FIG. 4(*c*)) is formed (drying process).

A known drying method such as hot air drying, hot roll drying, and infrared irradiation can be used as the drying method. The heating temperature is typically from 80 to 110° C., and preferably from 90 to 105° C. The heating time is typically from a few tens of seconds to a several tens of minutes, preferably from 60 seconds to 5 minutes, and more preferably from 90 seconds to 3 minutes.

Modification Process

Then, the gas barrier precursor layer produced by drying the layer containing the silicon-containing macromolecular compound is subjected to the modification process, and thus a high nitrogen-content region (sign 22 of FIG. 4(*d*)) is formed on the surface of the gas barrier precursor layer (modification process). Note that the region other than the high nitrogen-content region becomes a low nitrogen-content region (sign 21 of FIG. 4(*d*)).

The detail of the modification treatment is as described above.

In the method for manufacturing a gas barrier film (1) suitable for production of the first gas barrier film, the plasma irradiation time in the modification process is at least 300 seconds and, from the perspective of adequately ensure the thickness of the high nitrogen-content region and from the viewpoint of shorten a takt time during production, the plasma irradiation time is more preferably from 350 to 10000 seconds, more preferably from 400 to 5000 seconds, and even more preferably from 500 to 1000 seconds.

In the method for manufacturing a gas barrier film (2) suitable for production of the second gas barrier film, the plasma irradiation time in the modification process is at least 700 seconds and, from the perspective of further adequately ensure the thickness of the high nitrogen-content region and from the viewpoint of shorten a takt time during production, the plasma irradiation time is more preferably from 750 to 10000 seconds, more preferably from 800 to 6000 seconds, and even more preferably from 1000 to 3000 seconds.

Ultraviolet Irradiation Process

As described above, as necessary, ultraviolet irradiation is performed after start of heating the coating film for high nitrogen-content region formation but prior to the modification process (ultraviolet irradiation process).

The time from the completion of the ultraviolet irradiation process to the start of the modification process is preferably from 6 to 144 hours, more preferably from 12 to 120 hours, and even more preferably from 15 to 108 hours, from the viewpoint of adequately proceeding the conversion reaction of the silicon-containing macromolecular compound.

2-3. Other Process

Thereafter, as necessary, a protective film is provided on the gas barrier layer or on a face on a side opposite to the gas barrier layer of the base material film. This process is performed by, for example, disposing a pressure sensitive adhesive layer-formed face of the protective film facing a target face to be adhered, and sequentially pressing in a manner that air bubbles are not included.

EXAMPLES

Next, specific examples of an embodiment of the present invention are described; however, the present invention is not limited to these examples. The thickness $d_M$ of the high nitrogen-content region of the gas barrier layer of the gas barrier film produced in each of Examples and Comparative Examples described below, the element ratio in the depth direction of the gas barrier layer, the modulus of surface elasticity of the gas barrier layer, the water vapor transmission rate and durability testing of the gas barrier film were measured and calculated and evaluated by the following procedure.

Modulus of Surface Elasticity

Using a surface hardness tester (Nano Indenter, available from MTS), by an indenter in a trigonal pyramid shape, a modulus of surface elasticity at 23° C. of the gas barrier layer produced by the modification treatment of each of Examples 1 to 3 and Comparative Examples 1 to 7 was measured under conditions of a maximum indentation depth of the indenter of 100 nm, a strain rate of 0.05 sec$^{-1}$, a displacement amplitude of 2 nm, and an oscillation frequency of 45 Hz.

Thickness $d_M$ of High Nitrogen-Content Region of Gas Barrier Layer and Element Ratio in Depth Direction For each of the gas barrier films of Examples and Comparative Examples, using a high-resolution electron microscope (TITAN 80-300, available from FEI), cross-sectional TEM observation was performed under a condition of an acceleration voltage of 200 kV, and based on the obtained HAADF-STEM image, the thickness $d_G$ of the entire gas barrier layer and the thickness $d_M$ of the region having an element ratio of nitrogen of 5 at % or greater (high nitrogen-content region) were determined.

Furthermore, for the gas barrier film of each of Examples and Comparative Examples, using an X-ray photoelectron spectrometer (Quantum 2000, available from ULVAC-PHI, Inc.), the element ratio (at %) of each of contained atoms from the surface of the gas barrier layer in the depth direction was measured. Note that, for the measurement of the element ratio, the depth position of the measurement was determined by converting a sputtering time in the XPS measurement into the depth based on the measurement result of the cross-sectional TEM.

Note that, for the gas barrier film of Example 3, a graph showing element ratios in the depth direction of the gas barrier layer is shown in FIG. 3.

Water Vapor Transmission Rate (WVTR)

The gas barrier film produced in each of Examples 1 to 3 and Comparative Examples 1 to 7 was cut into a round test piece with an area of 50 cm$^2$, and the water vapor transmission rate (g/m$^2$/day) was measured at a gas flow rate of 20 sccm in an atmosphere at 40° C. and a relative humidity of 90% using a water vapor transmission rate measuring device (device name: AQUATRAN (registered trademark)-

2, available from MOCON, Inc). Note that the lower detection limit of the measuring device was 0.05 mg/m$^2$/day.
Distribution of Water Vapor Transmission Rate (WVTR) in Plane Surface For each of the gas barrier film of Examples 4 and 5 and Comparative Examples 8 and 9, a sample was produced by adhering a surface of a gas barrier layer with a calcium metal film of a glass substrate, which was prepared by laminating calcium metal using deposition apparatus (E-200, available from ALS) at a deposition rate of 80 nm/min for 20 minutes, by interposing an adhesive layer of an adhesive sheet A described below between the gas barrier layer and the calcium metal film. The resulting sample was stored in an atmosphere at 40° C. and a relative humidity of 90% for 500 hours, an image of the calcium film was taken from a back face side of the glass substrate (side opposite to the gas barrier layer) using a 12000 pixel digital camera. A square having an area of 50.5 mm×50.5 mm was freely cut out from the photographed image, this was sectioned into 64 squares having an identical shape, and a water vapor transmission rate of each section was calculated by the following equation (Expression (1)).

Using the resulting digital image and analytical software Color Count v1.3, taking a part having a score of shading of 100 or less as a corroded part and taking a part having a score of 101 or greater as an uncorroded part, a proportion of an area of the corroded part was calculated as a value of δ/A by dividing the number of bits of the corroded part by the total number of bits, and δ and A were each determined based on this value.

$$\text{Water vapor transmission rate } [\text{g/m}^2/\text{day}] = X \times 18 \times 2 \times \quad \text{Expression (1)}$$
$$(10^4/A) \times (24/T)$$

X (molar quantity of calcium hydroxide after storage at 40° C. and a relative humidity of 90% for 500 hours) $=(\delta \times t \times \alpha \times d_2)/M_2$ T (constant temperature and humidity treatment time) $=500$ [hours]

A: Area of corrodible metal (Ca) [cm$^2$]

δ: Area of corroded metal (Ca(OH)$_2$) [cm$^2$]

t (thickness of corrodible metal (Ca))=0.000015 [cm] (=150 [nm])

α (thickness correction coefficient after corrosion of corrodible metal)=$(M_2/d_2)/(M_1/d_1)$ $M_1$ (molecular weight of corrodible metal (Ca))=40.08

$M_2$ (molecular weight of metal hydroxide (Ca(OH)$_2$) after corrosion)=74.09

$d_1$ (density of corrodible metal (Ca))=1.550 [g/cm$^3$]

$d_2$ (density of metal hydroxide (Ca(OH)$_2$) after corrosion)=2.211 [g/cm$^3$]

Note that the mathematical expression is in accordance with the water vapor transmission measurement described in JP 2005-283561 A.

Then, the water vapor transmission rate was classified into the following seven categories A to G, and the number of sections corresponded to each category was calculated to determine an abundance ratio of the sections corresponded to each category with respect to the total number of sections, and thus distribution of the water vapor transmission rate in plane surface was determined.

A: Section with a WVTR of less than 1.0 g/m$^2$/day and 1.0×10$^{-1}$ g/m$^2$/day or greater B: Section with a WVTR of less than 1.0×10$^{-1}$ g/m$^2$/day and 1.0×10$^{-2}$ g/m$^2$/day or greater C: Section with a WVTR of less than 1.0×10$^{-2}$ g/m$^2$/day and 1.0×10$^{-3}$ g/m$^2$/day or greater D: Section with a WVTR of less than 1.0×10$^{-3}$ g/m$^2$/day and 1.0×10$^{-4}$ g/m$^2$/day or greater E: Section with a WVTR of less than 1.0×10$^{-4}$ g/m$^2$/day and 1.0×10$^{-5}$ g/m$^2$/day or greater F: Section with a WVTR of less than 1.0×10$^{-5}$ g/m$^2$/day and 1.0×10$^{-6}$ g/m$^2$/day or greater G: Section with a WVTR of less than 1.0×10$^{-6}$ g/m$^2$/day and 1.0×10$^{-7}$ g/m$^2$/day or greater Production of Adhesive Sheet A In 100 parts by mass of an isobutylene-isoprene copolymer (product name "Exxon Butyl 268", available from Japan Butyl Co., Ltd.), 5 parts by mass of a carboxylic acid-based functional group-containing polyisoprene-based rubber (product name "LIR 410", available from Kuraray Co., Ltd.) and 2 parts by mass of an epoxy-based cross-linking agent (product name "TC-5", available from Mitsubishi Chemical Corporation) were added and diluted with toluene, and thus a solution of an adhesive composition having a solid content concentration of 25 mass % was prepared.

Then, on a release-treated surface of a release film (product name "SP-PET38T103-1", available from LINTEC Corporation; thickness: 38 μm), the solution of the adhesive composition described above was applied to form a coating film, the coating film was dried at 110° C. for 1 minute to form an adhesive layer having a thickness of 20 μm, and thus am adhesive sheet A was produced.

Unevenness Lamination Test

For the gas barrier film produced in each of Examples 1 to 3 and Comparative Examples 1 to 7, using a method of evaluating moisture intrusion by discoloration of metal calcium, a lamination test for an adherend having a shape with a height difference, on the supposition of an actual electronic device, (unevenness lamination test) was performed.

Specifically, first, a material produced by depositing metal calcium on a glass substrate, which had a size of 50×50 mm and in which a square protrusion having a size of 15×15 mm and a height of 100 μm was formed in a central part, in a manner that the protrusion was covered by the metal calcium was prepared. Next, a sealing material (rubber pressure sensitive adhesive, product name "TN-286", available from Matsumura Oil Chemical Co., Ltd.) was formed on a surface of the gas barrier layer of the gas barrier film produced in each of Examples and Comparative Examples in a manner that the thickness was 20 μm. Then, the gas barrier film with the sealing material was adhered in a manner that the protrusion of the glass substrate was covered and allowed to stand still in an atmosphere at 23° C. and a relative humidity of 50% for 100 hours, and then the lamination body was observed. Evaluation was performed based on the following criteria.

A: No discoloration of metal calcium occurred.

B: Discoloration of metal calcium slightly occurred.

C: Discoloration of metal calcium occurred to the degree that practical use was not suitable.

Hygrothermal Durability Test

After the gas barrier film of each of Examples 1 to 3 and Comparative Examples 1 to 7 was allowed to stand still in an atmosphere at 85° C. and a relative humidity of 85% for 500 hours, the water vapor transmission rate was measured by the procedure described above. The percentage of change in the water vapor transmission rates was calculated based on the following Expression (2).

$$\text{Percentage of change in water vapor transmission rates [\%]}=(\text{value after hygrothermal test/initial value})\times100 \qquad \text{Expression (2)}$$

Then, the hygrothermal durability was evaluated based on the following criteria.

A: Percentage of change from the initial value was 150% or less

B: Percentage of change from the initial value was greater than 150% and 200% or less C: Percentage of change from the initial value was greater than 200%

Total Light Transmittance Measurement

For the gas barrier film of each of Examples 1 to 3 and Comparative Examples 1 to 7, the total light transmittance (%) was measured in accordance with JIS K 7361-1:1997 using a haze meter (product name "NDH-5000", available from Nippon Denshoku Industries Co., Ltd.). The total light transmittance of 85% or greater indicates being optically excellent.

Example 1

An untreated surface (PET face) of a polyethylene terephthalate (PET) film ("A-4160", available from Toyobo Co., Ltd.) that had been undergone primer treatment on one face and that had a thickness of 50 μm, perhydropolysilazane (available from DNF; weight average molecular weight: 10000 g/mol) was applied and thermally cured at 120° C. for 2 minutes, and thus a polysilazane layer was formed. The thickness of the polysilazane layer was 200 nm.

Then, using a plasma ion implantation device, the polysilazane layer was subjected to plasma ion implantation under the following conditions, and thus modification treatment was performed on the surface of the polysilazane layer. Therefore, a gas barrier film was produced.

The plasma ion implantation device used for the modification treatment and the plasma ion implantation conditions of the modification treatment are as follows.

Plasma Ion Implantation Device

RF power source: model number "RF" 56000, available from JEOL Ltd.

High-voltage pulse power source: "PV-3-HSHV-0835", available from Kurita Manufacturing Co., Ltd.

Plasma Ion Implantation Conditions

Plasma generating gas: helium (He)

Gas flow rate: 100 sccm

Duty ratio: 0.5%

Repetition frequency: 1000 Hz

Applied voltage: −8 kV

RF power source: frequency 13.56 MHz, applied electric power 1000 W

Chamber internal pressure: 0.2 Pa

Pulse width: 5 μsec

Treatment time (ion implantation time): 400 sec

Example 2

A gas barrier film was produced in the same manner as in Example 1 except for changing the treatment time of the modification treatment to 600 seconds.

Example 3

A gas barrier film was produced in the same manner as in Example 1 except for changing the treatment time of the modification treatment to 800 seconds.

Comparative Example 1

A gas barrier film was produced in the same manner as in Example 1 except for changing the plasma generating gas of the modification treatment to argon (Ar) and changing the treatment time of the modification treatment to 200 seconds.

Comparative Example 2

A gas barrier film was produced in the same manner as in Example 1 except for changing the plasma generating gas of the modification treatment to Ar and changing the treatment time of the modification treatment to 300 seconds.

Comparative Example 3

A gas barrier film was produced in the same manner as in Example 1 except for changing the plasma generating gas of the modification treatment to Ar.

Comparative Example 4

A gas barrier film was produced in the same manner as in Example 2 except for changing the plasma generating gas of the modification treatment to Ar.

Comparative Example 5

A gas barrier film was produced in the same manner as in Example 3 except for changing the plasma generating gas of the modification treatment to Ar.

Comparative Example 6

A gas barrier film was produced in the same manner as in Example 1 except for changing the treatment time of the modification treatment to 200 seconds.

Comparative Example 7

A gas barrier film was produced in the same manner as in Example 1 except for changing the treatment time of the modification treatment to 300 seconds.

The results of measurement and evaluation of the gas barrier films of Examples and Comparative Examples are shown in Table 1.

TABLE 1

| | | | Thickness | | | | Total | Uneven- | Durability test | | |
|---|---|---|---|---|---|---|---|---|---|---|---|
| | Gas type | Treatment time [sec] | $d_M$ (N ≥ 5 at %) [nm] | $d_M/d_G$ | Water vapor transmission rate [g · m$^{-2}$ · day$^{-1}$] | Modulus of surface elasticity [GPa] | light transmittance (%) | ness lamination test | Water vapor transmission rate [g · m$^{-2}$ · day$^{-1}$] | Percentage of change [%] | Decision |
| Example 1 | He | 400 | 33.0 | 0.165 | $4.2 \times 10^{-3}$ | 25.3 | ≥87 | A | $6.1 \times 10^{-3}$ | 145.2 | A |
| Example 2 | He | 600 | 40.7 | 0.204 | $3.7 \times 10^{-3}$ | 29.3 | ≥87 | A | $4.3 \times 10^{-3}$ | 116.2 | A |

TABLE 1-continued

| | Gas type | Treat-ment time [sec] | $d_M$ (N ≥ 5 at %) [nm] | $d_M/d_G$ | Water vapor transmission rate [g · m$^{-2}$ · day$^{-1}$] | Modulus of surface elasticity [GPa] | Total light trans - mittance (%) | Uneven-ness lami-nation test | Water vapor transmission rate [g · m$^{-2}$ · day$^{-1}$] | Percentage of change [%] | Decision |
|---|---|---|---|---|---|---|---|---|---|---|---|
| | | | | | | | | | Durability test | | |
| Example 3 | He | 800 | 55.7 | 0.279 | $3.5 \times 10^{-3}$ | 31.5 | ≥87 | A | $4.0 \times 10^{-3}$ | 114.3 | A |
| Comparative Example 1 | Ar | 200 | 9.8 | 0.049 | $9.2 \times 10^{-3}$ | 17.4 | ≥87 | C | $2.1 \times 10^{-3}$ | 228.3 | C |
| Comparative Example 2 | Ar | 300 | 12.4 | 0.062 | $9.1 \times 10^{-3}$ | 17.9 | ≥87 | C | $2.0 \times 10^{-2}$ | 219.8 | C |
| Comparative Example 3 | Ar | 400 | 13.9 | 0.070 | $8.1 \times 10^{-3}$ | 19.1 | ≥87 | C | $1.9 \times 10^{-3}$ | 234.6 | C |
| Comparative Example 4 | Ar | 600 | 14.7 | 0.074 | $8.2 \times 10^{-3}$ | 18.9 | ≥87 | C | $1.8 \times 10^{-3}$ | 219.5 | C |
| Comparative Example 5 | Ar | 800 | 20.9 | 0.105 | $7.4 \times 10^{-3}$ | 18.3 | >87 | C | $1.7 \times 10^{-3}$ | 229.7 | C |
| Comparative Example 6 | He | 200 | 26.3 | 0.132 | $5.8 \times 10^{-3}$ | 24.1 | ≥87 | B | $8.9 \times 10^{-3}$ | 153.4 | B |
| Comparative Example 7 | He | 300 | 29.2 | 0.146 | $5.5 \times 10^{-3}$ | 24.3 | ≥87 | B | $8.4 \times 10^{-3}$ | 152.7 | B |

As is clear from the results in Table 1, the gas barrier film of each of Examples 1 to 3 had a region containing silicon, oxygen, and nitrogen and having an element ratio of nitrogen of 5 at % or greater, and the thickness $d_M$ of the region was 30 nm or greater. In addition, the gas barrier property was excellent, and the change in gas barrier property was small even after the hygrothermal durability test. Furthermore, the modulus of surface elasticity was suitable, and evaluation of the unevenness lamination test was also excellent. Furthermore, the total light transmittance was a significantly high value. In particular, it was found that the gas barrier film of each of Examples 2 and 3 had the thickness $d_M$ of 40 nm or greater, and improvement in these properties were even more remarkable.

Note that, as shown in the graph in FIG. 3, in the gas barrier film of Example 3, it was clear that, in change in an element ratio of silicon, an element ratio of oxygen, and an element ratio of nitrogen in the depth direction of the gas barrier layer, a point indicating the maximum value of the element ratio of nitrogen, a point indicating the maximum value of the element ratio of silicon, and a point indicating the minimum value of the element ratio of oxygen were present in the region in the depth of 20 to 40 nm. Similarly, in the gas barrier films of the other Examples, it was confirmed that points showing the maximum values of the element ratio of nitrogen and the element ratio of silicon, and a point showing the minimum value of the element ratio of oxygen existed.

On the other hand, for the gas barrier film of each of Comparative Examples 1 to 5, because the gas used for the plasma irradiation was changed to argon, an adequate thickness of the high nitrogen-content region could not be achieved even when the treatment time was made longer, and the thickness $d_M$ was less than 30 nm. Therefore, it was clear that the evaluation results of the gas barrier property, the percentage of change in the gas barrier property, the modulus of surface elasticity, and the unevenness lamination test were all inferior to those of the gas barrier films of Examples. Furthermore, the gas barrier film of each of Comparative Examples 6 and 7, because the treatment time was shorter than those of Examples 1 to 3, an adequate thickness of the high nitrogen-content region could not be achieved, and the thickness $d_M$ was less than 30 nm. Therefore, it was clear that the evaluation results of the gas barrier property, the percentage of change in the gas barrier property, the modulus of surface elasticity, and the unevenness lamination test were all inferior to those of the gas barrier films of Examples.

Example 4

An untreated surface (PET face) of a polyethylene terephthalate (PET) film ("A-4160", available from Toyobo Co., Ltd.) that had been undergone primer treatment on one face and that had a thickness of 50 μm, perhydropolysilazane (available from DNF; weight average molecular weight: 10000 g/mol) was applied by a die coating method performed by roll-to-roll processing using a coating machine, and thermally cured at 100° C. for 2 minutes, and thus a polysilazane layer was formed. The film thickness of the polysilazane layer was 200 nm.

Then, using a plasma ion implantation device, the polysilazane layer was subjected to plasma ion implantation under the following conditions, and thus modification treatment was performed on the surface of the polysilazane layer. Therefore, a gas barrier film was produced.

The plasma ion implantation device used for the modification treatment and the plasma ion implantation conditions of the modification treatment are as follows.

Plasma Ion Implantation Device

RF power source: model number "RF" 56000, available from JEOL Ltd.

High-voltage pulse power source: "PV-3-HSHV-0835", available from Kurita Manufacturing Co., Ltd.

Plasma Ion Implantation Conditions

Plasma generating gas: helium (He)

Gas flow rate: 100 sccm

Duty ratio: 0.5%

Repetition frequency: 1000 Hz

Applied voltage: −8 kV

RF power source: frequency 13.56 MHz, applied electric power 1000 W

Chamber internal pressure: 0.2 Pa

Pulse width: 5 μsec

Treatment time (ion implantation time): 800 sec

Example 5

A gas barrier film was produced in the same manner as in Example 4 except for changing the treatment time of the modification treatment to 1600 seconds.

Comparative Example 8

A gas barrier film was produced in the same manner as in Example 4 except for changing the plasma generating gas of the modification treatment to argon (Ar) and changing the treatment time of the modification treatment to 200 seconds.

Comparative Example 9

A gas barrier film was produced in the same manner as in Example 4 except for changing the treatment time of the modification treatment to 200 seconds.

The results of measurement and evaluation of the gas barrier film of each of Examples 4 and 5 and Comparative Examples 8 and 9 are shown in Table 2.

TABLE 2

| | Gas type | Treatment time [sec] | Thickness $d_M$ [nm] | Abundance ratio with respect to the total number of sections [%] | | | | | | | Sum of D to G | WVTR [g/m$^2$/day] |
|---|---|---|---|---|---|---|---|---|---|---|---|---|
| | | | | A | B | C | D | E | F | G | | |
| Example 4 | He | 800 | 51 | 0 | 1 | 1 | 15 | 64 | 15 | 4 | 98 | $2.4 \times 10^{-4}$ |
| Example 5 | He | 1600 | 65 | 0 | 0 | 0 | 37 | 49 | 7 | 7 | 100 | $7.6 \times 10^{-5}$ |
| Comparative Example 8 | Ar | 200 | 15 | 0 | 30 | 21 | 28 | 17 | 4 | 0 | 49 | $4.8 \times 10^{-3}$ |
| Comparative Example 9 | He | 200 | 21 | 0 | 1 | 25 | 71 | 3 | 0 | 0 | 74 | $5.6 \times 10^{-4}$ |

A: Section with a WVTR of less than 1.0 g/m$^2$/day and $1.0 \times 10^{-1}$ g/m$^2$/day or greater
B: Section with a WVTR of less than $1.0 \times 10^{-1}$ g/m$^2$/day and $1.0 \times 10^{-2}$ g/m$^2$/day or greater
C: Section with a WVTR of less than $1.0 \times 10^{-2}$ g/m$^2$/day and $1.0 \times 10^{-3}$ g/m$^2$/day or greater
D: Section with a WVTR of less than $1.0 \times 10^{-3}$ g/m$^2$/day and $1.0 \times 10^{-4}$ g/m$^2$/day or greater
E: Section with a WVTR of less than $1.0 \times 10^{-4}$ g/m$^2$/day and $1.0 \times 10^{-5}$ g/m$^2$/day or greater
F: Section with a WVTR of less than $1.0 \times 10^{-5}$ g/m$^2$/day and $1.0 \times 10^{-6}$ g/m$^2$/day or greater
G: Section with a WVTR of less than $1.0 \times 10^{-6}$ g/m$^2$/day and $1.0 \times 10^{-7}$ g/m$^2$/day or greater As is clear from the results in Table 2, for the gas barrier film of each of Examples 4 and 5, the total number of sections classified as "D" to "G", which were sections with water vapor transmission rates of less than $1.0 \times 10^{-3}$ g/m$^2$/day, was 98% or greater of the total number of sections. Furthermore, the water vapor transmission rate in the entire gas barrier film was low ($2.4 \times 10^{-4}$ g/m$^2$/day or less). Therefore, it was clear that the gas barrier film of each of Examples 4 and 5 had a less presence of pinholes in the entire gas barrier layer and had excellent gas barrier property.

On the other hand, the gas barrier film of each of Comparative Examples 8 and 9 had the total number of sections classified as "B" and "C", which were sections with water vapor transmission rates of less than $1.0 \times 10^{-1}$ g/m$^2$/day and $1.0 \times 10^{-3}$ g/m$^2$/day or greater, remarkably greater than those of the gas barrier films of Examples 4 and 5, and the total number of sections classified as "D" to "G", which were sections with water vapor transmission rates of less than $1.0 \times 10^{-3}$ g/m$^2$/day was 74% or less of the total number of sections. The gas barrier film of each of Comparative Examples 8 and 9 had a large number of pinholes in the entire gas barrier layer, and it was clear that the gas barrier film of each of Comparative Examples 8 and 9 had lower gas barrier property than those of the gas barrier films of Examples 4 and 5.

INDUSTRIAL APPLICABILITY

The first gas barrier film of an embodiment of the present invention has a high gas barrier property and a high modulus of surface elasticity and has excellent hygrothermal durability. Therefore, the first gas barrier film can be suitably used in a wide range of fields, such as an electronic device, an electronic component, and an optical component. For example, the first gas barrier film can be used for an organic EL element, an organic EL display element, an inorganic EL element, an inorganic EL display element, an electronic paper element, a liquid crystal display element, and a solar cell element. Furthermore, because resistance against stress from outside is achieved and reduction in performance can be suppressed in a hot and humid environment, problems are less likely to occur during storage or transport as an intermediate product before assembly into a product described above.

Furthermore, the second gas barrier film of an embodiment of the present invention has a high gas barrier property in the entire film, and thus can be suitably used in a wide range of fields, such as an electronic device, an electronic component, and an optical component, similarly to the first gas barrier film. In particular, the second gas barrier film can ensure a high gas barrier property in the entire plane part of a display, a photosensitive surface, or the like of an end product or an intermediate product having a large size, such as a display element, a solar cell element, or the like.

The present application is based on Japanese patent application (JP 2022-053925) filed on Mar. 29, 2022, the entire contents thereof being hereby incorporated by reference.

REFERENCE SIGNS LIST

10: Base material film
20: Gas barrier layer
21: Region having element ratio of nitrogen of less than 5 at % (low nitrogen-content region)
21a: Coating film of composition containing silicon-containing macromolecular compound
21b: Layer produced by drying and curing coating film (gas barrier precursor layer)
22: Region having element ratio of nitrogen of 5 at % or greater (high nitrogen-content region)
100, 101, 102: Gas barrier film $d_G$: Thickness of gas barrier layer $d_M$: Thickness of region having element ratio of nitrogen of 5 at % or greater (high nitrogen-content region)

The invention claimed is:

1. A gas barrier film, comprising:

a gas barrier layer, on a base material film, containing silicon and oxygen as main components, wherein the gas barrier layer has a high nitrogen-content region and a low nitrogen-content region in a thickness direction, the high nitrogen-content region contains silicon, oxygen, and nitrogen, and has an element ratio of nitrogen of 5 at % or greater, the low nitrogen-content region has an element ratio of nitrogen smaller than 5 at %, the high nitrogen-content region has a thickness $d_M$ of 40.7 nm or greater and 65 nm or smaller, and the high nitrogen-content region, the low nitrogen-content region, and the base material film are arranged in this order from a surface of the gas barrier layer.

2. The gas barrier film according to claim 1, wherein change in an element ratio of silicon, an element ratio of oxygen, and an element ratio of nitrogen in the thickness direction of the gas barrier layer has a point indicating a maximum value of the element ratio of nitrogen, a point indicating a maximum value of the element ratio of silicon, and a point indicating a minimum value of the element ratio of oxygen, and the maximum value of nitrogen is smaller than the minimum value of oxygen and the maximum value of silicon.

3. The gas barrier film according to claim 1, wherein a water vapor transmission rate in an atmosphere at 40° C. and a relative humidity of 90% is less than $6.0 \times 10^{-3}$ g/m²/day.

4. The gas barrier film according to claim 1, wherein a thickness $d_G$ of the gas barrier layer and the thickness $d_M$ of the high nitrogen-content region satisfy a relationship $1 > d_M/d_G \geq 0.01$.

5. The gas barrier film according to claim 1, wherein a modulus of surface elasticity of the gas barrier film is 24.5 GPa or greater.

* * * * *